Patented Aug. 12, 1941

2,252,550

UNITED STATES PATENT OFFICE 2,252,550

FRACTIONAL DISTILLATION

Leslie B. Bragg, Scotch Plains, N. J., assignor to Foster Wheeler Corporation, New York, N. Y., a corporation of New York Application December 28, 1938, Serial No. 248,068

8 Claims. (Cl. 196—141)

This invention relates to the fractional distillation of composite liquids, such as hydrocarbon oils and the like, and more particularly pertains to the control of fractions obtained from such liquids.

This application is a continuation-in-part of application Serial No. 60,905, filed January 27, 1936.

The invention provides a novel method of controlling side streams or intermediate fractions during the fractional distillation of composite liquids, such as hydrocarbon oils and the like, and a novel arrangement of apparatus for carrying out the method, which will provide side streams or intermediate fractions of constant or substantially constant physical characteristics, such as boiling range, flash point, gravity, viscosity, etc., independently of variations in the quantity of steam supplied to the fractionating tower or zone and the pressure existing therein, as well as independently of the rate, temperature and composition of the feed, and will further maintain the side streams as constant or substantially constant percentages of the feed independently of variations in the rate or the temperature of the feed and of variations in the quantity of steam supplied to the fractioning zone or of variations in the pressure existing therein, so long as the feed composition remains substantially constant.

Figure 1:
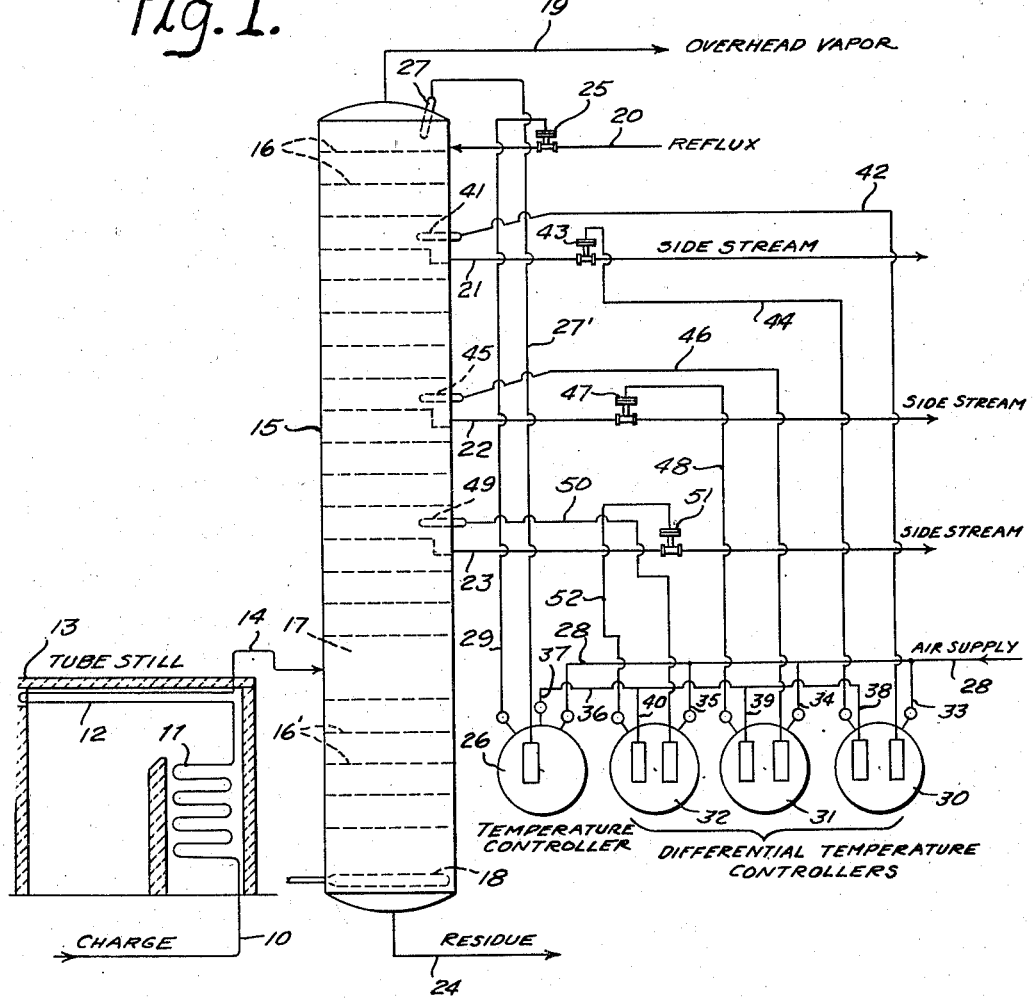
Figure 2:
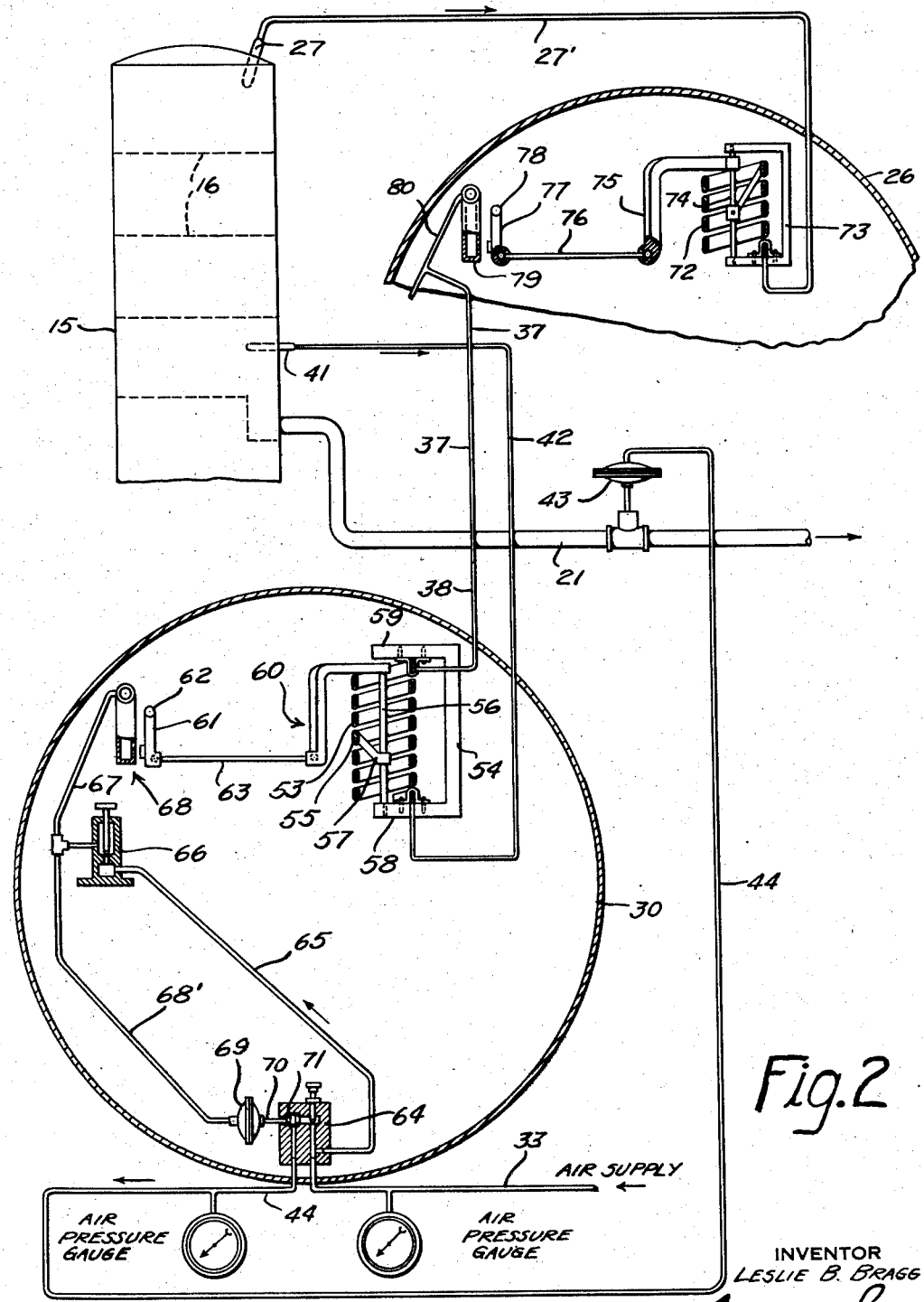

The invention will be understood from the following description when considered in connection with the accompanying drawings forming a part thereof, and in which:

Fig. 1 illustrates diagrammatically a preferred form of apparatus embodying the invention for carrying out the method of the invention, and Fig. 2 illustrates more or less diagrammatically the action and interaction of the temperature controller and the differential temperature controllers shown in Fig. 1.

Referring to the drawings, the feed stock or charge is passed through line 10 into and through heating coils 11 and 12 of a heater 13. The oil after being heated as desired to vaporization temperature, is conducted through transfer line 14 into the lower portion of a fractionating tower 15. This tower may be of conventional construction with a plurality of superposed bubble trays 16 or their equivalent, with suitable downflow pipes so that vapors may flow upwardly through the tower countercurrent to and in contact with reflux flowing downwardly through the tower from tray to tray. The vapors of the oil introduced into separating chamber 17 of the tower flow upwardly therethrough and the unvaporized portion flows downwardly over the trays 16'. Superheated steam may be introduced into the tower at the bottom through a perforated coil 18. The lightest fraction of the oil in vapor form is withdrawn from the top of the tower through line 19 and is conducted thereby to suitable cooling and condensing equipment which separates the oil fraction from the steam mixed therewith. Part of the condensate is returned to the top of the tower through line 20 as reflux. In the form of the invention illustrated, a plurality of side streams are withdrawn from the tower through lines 21, 22 and 23. It will be understood however, that any desired number of side streams greater or less than three may be withdrawn if desired. Residue is withdrawn from the bottom of the tower through line 24.

The temperature at the top of the tower is controlled or maintained at a sustantially constant value by controlling the quantity of reflux introduced through line 20 into the top of the tower. In the form of the invention disclosed, this is accomplished by a motor valve 25 in reflux line 20 which is controlled by a temperature controller 26 of any well known type (the essential features of which are disclosed in Mason Patent Re. 20,092 which is actuated in response to thermometer bulb 27 disposed in the tower at its upper end and connected to the controller through a line 27'. In the form shown, air is supplied through line 28 to the temperature controller 26 and the operation of the controller is such that the pressure of air in line 29 connecting the controller 26 with the motor valve 25 is controlled by the thermometer bulb 27, the operation being such that as the temperature tends to increase at the top of the tower, motor valve 25 will operate to permit a greater quantity of reflux to be supplied to the top of the tower and as the temperature at the top of the tower tends to decrease, motor valve 25 will be actuated to restrict the flow of reflux into the tower.

In accordance with the present invention, each of the side streams removed from the tower is controlled with respect to the quantity of side stream withdrawn or the rate at which the side stream is withdrawn, so as to maintain a substantially constant temperature difference between the top of the tower and each portion of the tower from which a side stream is withdrawn with different temperature differences maintained between the top of the tower and each point at which a side stream is withdrawn. In the form of the invention disclosed, this is accomplished by the use of differential temperature controllers 30, 31 and 32, which operate to control the volume, or rate, of withdrawal of the side streams 21, 22 and 23 respectively, to thereby maintain constant temperature differences between the temperature at the top of the tower and the temperature at the portions of the tower from which each of these side streams is withdrawn. In this manner, the physical characteristics of the side streams or intermediate fractions, such as boiling range, flash point, gravity, viscosity, etc., are maintained substantially constant irrespective of variations in the quantity of steam supplied to the tower and of variations in the pressure in the tower. The physical characteristics of the side streams also are maintained substantially constant independently of the rate or temperature of the feed and of the composition of the feed so long as the feed contains the components of the side stream in vapor or in vaporizable form under the operating conditions present. In addition thereto, the side streams are maintained as constant or substantially constant percentages of the feed independently of the temperature or the rate of feed or of the pressure in or the steam supplied to the tower so long as the composition of the feed remains substantially constant.

In the embodiment selected for illustration, the controllers 30, 31 and 32 are connected to air supply line 28 through air lines 33, 34 and 35, respectively. These controllers are also connected by air lines 38, 39 and 40 respectively, to what may conveniently be termed a secondary air line 36 which is connected at its inlet end to temperature controller 26 through line 37. Controller 30 is actuated in response to the operation of a thermometer bulb 41 disposed in the tower 15 at or adjacent the point of withdrawal of side stream 21. Bulb 41 is connected to controller 30 through line 42. A motor valve 43 disposed in line 21 controls the withdrawal of the side stream through this line in response to the operation of controller 30 to which it is connected by air line 44. The other side streams withdrawn from the tower are controlled in a similar manner. Thermometer bulb 45 is disposed at or adjacent to the point of withdrawal of side stream 22 and is connected to controller 31 by line 46. Motor valve 47 in line 22 is connected to controller 31 through air line 48. Thermometer bulb 49 is disposed at or adjacent to the point of withdrawal of side stream 23 and is connected to controller 32 by line 50. Motor valve 51 controlling line 23 is connected to controller 32 by air line 52.

The thermometer bulbs 41, 45 and 49 may be disposed in the tower so that they are in contact with or submerged in the liquid on the tray from which the side stream is withdrawn, or they may be disposed above the level of the liquid on these trays so that they normally are in contact with the vapors rising from these trays. While the locations described are preferred, moderately satisfactory operation and control of the side streams may be obtained by disposing these bulbs at other locations in the tower. For example, each may be disposed in contact with the liquid or the vapors rising therefrom, on a tray below the tray from which the side stream is withdrawn or a tray above the tray from which the side stream is withdrawn. That these locations are moderately satisfactory for the thermometer bulbs is due to the fact that there ordinarily exists a temperature relationship between the liquids on adjacent trays and the vapors rising therefrom.

The temperature controller 26 operates in response to the temperature of the fluid in the thermometer bulb 27 in such a manner that an air pressure is built up in line 37 and transmitted through this line to line 38, which air pressure varies in proportion to the fluid pressure in the thermometer bulb 27. This pressure is transmitted to the upper portion of the tubular helical spring 53, which is solidly connected at both ends to the support 54. The tubular helical spring 53 is closed approximately at the center as indicated at point 55 so that the pressure introduced through line 38 is exerted only in the section of the helical spring above point 55. Should the temperature of the thermometer bulb 27 tend to rise, there will be an increase in the air pressure in line 38 and in the upper portion of the helical spring 53 which will tend to cause the upper portion of the helical spring to unwind and since it is held in a fixed position at the upper end, will cause the point 55 to move in a clockwise direction when viewed from the top. The helical spring 53 is connected to a rotatable spindle 56 by means of a lever arm 57 at point 55, the spindle being pivoted in the support 54 at points 58 and 59. Thus the clockwise movement of the helical spring—induced by an increase in air pressure in line 38—will result in a clockwise movement of the spindle 56 and also of the lever arm 60, which is rigidly attached to the spindle 56, thereby moving the flapper 61 to the left about the pivot 62 and toward air nozzle 68 by means of the connecting link 63. The lower portion of the helical spring 53 is connected by line 42 to the thermometer bulb 41. Thus, if the temperature in tower 15 tends to rise, there will result an increase in pressure of the fluid in the temperature bulb 41, line 42, and the lower half of the helical spring 53. This will tend to cause the helical spring to unwind and since it is held in a fixed position at the lower end, will cause the point 55 to move in a counter clockwise direction when viewed from the top and will further result in a similar movement of the spindle 56, thereby moving the flapper 61 to the right about pivot 62 and away from air nozzle 68 by means of connecting link 63.

Assuming a condition of constant temperature at the top of the tower, as measured by thermometer bulb 27, the pressure in the upper portion of the helical spring 53 will remain constant so that if the temperature in the tower, as measured by thermometer bulb 41 tends to increase, flapper 61 will move to the right and away from air nozzle 68. The supply of air provided to the controller through line 33 passes through valve mechanism 64 into line 65, through a controlling valve 66, into line 67 and outward to the atmosphere through nozzle 68. This air is supplied at a constant rate, the rate being adjusted by the throttling valve 66 and when allowed to escape at a constant rate through nozzle 68 maintains a definite pressure in the closed diaphragm 69, which is connected to line 67 by line 68'. However, when the position of the flapper valve is changed, as indicated above, by movement of the flapper to the right and away from the nozzle, the air escapes more readily through the nozzle opening and consequently the pressure in lines 67 and 68' decreases, which in turn results in a decrease in the pressure in diaphragm 69. The left hand end of the diaphragm 69 is fixed in position, the right hand end being connected through rod 70 with valve 71. As valve 71 moves to the left, as a result of the collapsing of diaphragm 69, air is admitted into line 44 and to the diaphragm of control valve 43, thereby building up a greater pressure in the diaphragm of control valve 43 and tending to close valve 43, which results in a decrease in the flow of liquid through sidestream line 21, thereby resulting in an increase in the quantity of reflux flowing downward through tower 15 below the point of the withdrawal of the sidestream which tends to decrease the temperature in the tower at the point of thermometer bulb 41.

If for some reason, the temperature in the tower adjacent to thermometer bulb 41 should tend to decrease, there will result a decrease in the pressure of the fluid in the lower half of the helical spring 53 which will tend to cause the helical spring to wind up more tightly and will cause spindle 56 to move in a clockwise direction when viewed from the top, thereby moving the flapper 61 to the left about the pivot 62 and toward the air nozzle 68 by means of the connecting link 63. This will result in a diminishing of the ease of escape of air through nozzle 68 and increasing the pressure in lines 67 and 68', which will result in an increase in the pressure in diaphragm 69 and an expansion of the diaphragm, thereby moving the stem 70 of the valve 71 to the right, decreasing the opening for the passage of air into line 44 and increasing the opening for the escape of air from line 44 to the atmosphere around stem 70. This will reduce the pressure of the air in the line 44 and in the diaphragm of control valve 43, which will result in a tendency for valve 43 to open, which in turn will allow an increase in the rate of flow of liquid through the sidestream line 21 and correspondingly a decrease in the quantity of reflux flowing downward through tower 15 below the point of the withdrawal of the sidestream, and consequently will tend to increase the temperature within the tower adjacent to thermometer bulb 41.

The foregoing description of the operation is based on the assumption that the temperature at the top of the tower surrounding thermometer bulb 27 is constant. If however, the temperature in the top of the tower surrounding thermometer bulb 27 varies, it is necessary that an adjustment be made whereby the temperature within the tower at the point adjacent to thermometer bulb 41 will be kept a definite number of degrees higher than the temperature at the point of thermometer bulb 27. This is accomplished automatically by means of the connection of the upper and lower portions of helical spring 53 whereby if the temperature within the top of the tower surrounding thermometer bulb 27 increases for instance, the pressure within the upper portion of the helical spring 53 will increase and cause the flapper 61 to move toward nozzle 68. This movement of the flapper will result in a decrease in the opening for the escape of air from the nozzle, and a decrease in the pressure in lines 67 and 68' and will cause diaphragm 69 to expand, thereby moving valve stem 70 and valve 71 to the right, which will allow air to escape around valve stem 70 from the line 44 and will result in an increase in the flow of liquid through sidestream line 21. This will, however, result in an increase in the temperature within the tower at the point adjacent to thermometer bulb 41. If the temperature within the top of the tower adjacent to thermometer bulb 27 decreases, the opposite reactions will result and the flow of liquid through sidestream 21 will be increased as a result of which the temperature within the tower adjacent to thermometer bulb 41 will decrease. The mechanisms described above are so proportioned and constructed that any change in the temperature of thermometer bulb 27 will cause an equivalent change in the temperature in the tower adjacent to thermometer bulb 41.

In like manner, the sidestream withdrawn through line 22 is controlled by a similar differential temperature controller 31 which is connected to thermometer bulb 45 and which controls the motor valve 47 in line 22. Also in like manner, the differential temperature controller 32, which is connected to thermometer bulb 49 in the side stream draw-off line 23, controls the motor valve 51 in line 23.

Temperature controller 26 operates the same as differential controller 30 excepting that the helical spring 72 has only one section which corresponds to the lower section only of helical spring 53 of differential controller 30. Thus, if the temperature in thermometer bulb 27 tends to rise, there will be an increase in the pressure of the fluid within the thermometer bulb which will be transmitted through line 27' to the tubular helical spring 72, and as a result of the increase in pressure, this spring will tend to unwind and since the lower end of this spring is firmly fixed to support 73, it will cause spindle 74 to move in a counterclockwise direction when viewed from the top, and will move lever arm 75 in a counterclockwise direction and thereby move the flapper 77 to the right about the pivot 78 and away from the nozzle 79 by means of the connecting link 76. As previously described, this will result in a decrease in air pressure in the line 80, thereby allowing the diaphragm which corresponds to diaphragm 69 of the differential temperature controller to partially collapse admitting more air into line 29 and increasing the pressure within motor valve 25, which is of the type which opens when the pressure in the diaphragm increases, so that an increase in pressure within the diaphragm of the motor valve results in an opening of the valve thereby increasing the quantity of reflux introduced into the tower through reflux line 20 which tends to decrease the temperature within the top of the tower adjacent to thermometer bulb 27. Should the temperature in the top of the tower adjacent to thermometer bulb 27 tend to decrease, the opposite reaction will occur, resulting in a decrease in pressure in the air line 29, which will decrease the flow of reflux through line 20 until the desired temperature is again attained.

Other types of instruments than those disclosed may be employed and these may be actuated by the use of mechanically, electrically, pneumatically or hydraulically operated mechanisms.

The result of the operation of the differential temperature controllers is such that the quantity of side stream withdrawn in each stream, or the rate at which each side stream is withdrawn, is so controlled that substantially constant temperature differences are maintained between the top of the tower and each of the points from which side streams are withdrawn. By so controlling the withdrawal of side streams, it will be apparent that substantially constant temperatures will be maintained at the points from which side streams are withdrawn and that definite or predetermined temperature differences will be maintained between the top of the tower and each of the points at which side streams are removed.

With this arrangement, the physical characteristics of side streams, such as boiling range, flash point, gravity, viscosity, etc., withdrawn from the tower are maintained substantially constant irrespective of variations in at least five factors affecting the distillation process, that is, the quantity of steam used, the pressure existing in the fractionating zone, the rate of feed, the temperature of the feed and the composition of the feed, so long as the feed contains the components of the side streams in vapor or in vaporizable form under the operating conditions present. The side streams also will be maintained as constant or substantially constant percentages of the feed independently of variations in at least four factors affecting the distillation process, that is, the rate and temperature of the feed, the pressure at which the distillation is carried out and the quantity of steam used, so long as the composition of the feed remains constant or substantially constant.

Should the amount of steam supplied to the tower be varied or should the tower pressure be changed, it will be necessary to change the setting of the top tower temperature controller but it will not be necessary in any way to change the adjustment of the differential temperature controllers.

Inasmuch as variations in the form of the apparatus disclosed and in the arrangement and disposition of the several parts thereof as well as in the process herein disclosed may be made without departing from the principles of the invention, it will be understood that the invention is not to be limited excepting by the scope of the appended claims.

What is claimed is:

1. Apparatus for fractionally distilling hydrocarbon oils and the like comprising a fractionating tower, means for introducing vaporized oil into the tower, means in the tower for passing the vapors in contact with reflux, means for withdrawing a side stream from a portion of the tower, a valve for controlling the quantity of said side stream withdrawn from the tower, a temperature controller for regulating the setting of said valve and operating in response to a thermostat disposed in said portion of the tower, the operation of the temperature controller being modified by another thermostat disposed in another portion of said tower and operating to maintain a substantially uniform boiling range of the product withdrawn from said other portion by controlling the reflux at the other portion of the tower, the combined action of both thermostats resulting in the maintenance of a substantially constant difference in temperature between said portions of the tower whereby the boiling range of the product withdrawn from said first mentioned portion of the tower is automatically maintained substantially constant.

2. Apparatus for fractionally distilling hydrocarbon oils and the like comprising a fractionating tower, means for introducing vaporized oil into the tower, means in the tower for passing the vapors in contact with reflux, means for withdrawing a side stream from a portion of the tower, a valve for controlling the quantity of said side stream withdrawn from the tower, a temperature controller for regulating the setting of said valve and operating in response to a thermostat disposed in said portion of the tower, the operation of the temperature controller being modified by another thermostat disposed in the upper portion of said tower and operating to maintain a substantially uniform boiling range of the product withdrawn from said upper portion by controlling the reflux at the upper portion of the tower, the combined action of both thermostats resulting in the maintenance of a substantially constant difference in temperature between said portions of the tower whereby the boiling range of the product withdrawn from said first mentioned portion of the tower is automatically maintained substantially constant.

3. Apparatus for fractionally distilling hydrocarbon oils and the like comprising a fractionating tower, means for introducing vaporized oil into the tower, means in the tower for passing the vapors in contact with reflux, means for withdrawing a stream from a portion of the tower, a valve for controlling the quantity of said stream withdrawn from the tower, a temperature controller for regulating the setting of said valve and operating in response to a thermostat disposed in said portion of the tower, the operation of the temperature controller being modified by another thermostat disposed in another portion of said tower and operating to maintain a substantially uniform boiling range of the product withdrawn from said other portion by controlling the reflux at the other portion of the tower independently of the control of the quantity of said stream withdrawn from the tower, the combined action of both thermostats resulting in the maintenance of a substantially constant difference in temperature between said portions of the tower whereby the boiling range of the product withdrawn from said first mentioned portion of the tower is automatically maintained substantially constant.

4. Apparatus for fractionally distilling hydrocarbon oils and the like comprising a fractionating tower, means for introducing vaporized oil into the tower, means in the tower for passing the vapors in contact with reflux, means for withdrawing a plurality of side streams from the tower, a valve for controlling the quantity of each side stream withdrawn from the tower, a temperature controller for regulating the setting of each valve and operating in response to a thermostat disposed in the portion of the tower from which the side stream is withdrawn, the operation of each temperature controller being modified by another thermostat disposed in a portion of the tower other than the portions from which the side streams are withdrawn and operating to maintain a substantially uniform boiling range of the product withdrawn from said other portion of the tower by controlling the reflux at said other tower portion, the combined action of all said thermostats resulting in the maintenance of a substantially constant difference in temperature between each of the portions of the tower from which side streams are withdrawn and said other tower portion, whereby the boiling range of the side streams withdrawn from the tower is automatically maintained substantially constant.

5. The method of fractionally distilling hydrocarbon oils and the like which comprises feeding vaporized oil to a fractionating zone, passing vapors of the oil in contact with reflux in said zone, withdrawing a side stream from a portion of said zone, regulating the quantity of side stream withdrawn from said zone to control the temperature in said portion of said zone, said regulating action being modified by the temperature in another portion of said zone wherein the quantity of reflux is controlled to maintain a substantially uniform boiling range of the product withdrawn from said other portion, the operation being such as to maintain a substantially constant difference in temperature between said portions of the fractionating zone whereby the boiling range of the side stream withdrawn is automatically maintained substantially constant.

6. The method of fractionally distilling hydrocarbon oils and the like which comprises feeding vaporized oil to a fractionating zone, passing vapors of the oil in contact with reflux in said zone, withdrawing a side stream from a portion of said zone, regulating the quantity of side stream withdrawn from said zone to control the temperature in said portion of said zone, said regulating action being modified by the temperature in the upper portion of said zone wherein the reflux is controlled to maintain a substantially uniform boiling range of the product withdrawn from said upper portion, the operation being such as to maintain a substantially constant difference in temperature between said portions of the fractionating zone whereby the boiling range of the side stream withdrawn is automatically maintained substantially constant.

7. The method of fractionally distilling hydrocarbon oils and the like which comprises feeding vaporized oil to a fractionating zone, passing vapors of the oil in contact with reflux in said zone, withdrawing a stream from a portion of said zone, regulating the quantity of stream withdrawn from said zone to control the temperature in said portion of said zone, said regulating action being modified by the temperature in another portion of said zone wherein the reflux is controlled independently of the regulation of said stream to maintain a substantially uniform boiling range of the product withdrawn from said other portion, the operation being such as to maintain a substantially constant difference in temperature between said portions of the fractionating zone whereby the boiling range of the stream withdrawn is automatically maintained substantially constant.

8. The method of fractionally distilling hydrocarbon oils and the like which comprises feeding vaporized oil to a fractionating zone, passing vapors of the oil in contact with reflux in said zone, withdrawing a plurality of side streams from different portions of said zone, regulating the quantity of each side stream withdrawn to control the temperature in the portion of said zone from which the side stream is withdrawn, the regulating action with respect to each side stream being modified by the temperature in a portion of said zone other than the portions from which the side streams are withdrawn wherein said other portion of the zone the reflux is controlled to maintain a substantially uniform boiling range of the product withdrawn from said other portion, the operation being such as to maintain substantially constant differences in temperature between each of the portions of said zone from which side streams are withdrawn and said other portion, whereby the boiling range of the side streams withdrawn is automatically maintained substantially constant.

LESLIE B. BRAGG.